H. D. JAMES & W. A. DICK.
SYSTEM OF ELECTRIC MOTOR CONTROL.
APPLICATION FILED OCT. 18, 1907.

924,785.

Patented June 15, 1909.
2 SHEETS—SHEET 2.

WITNESSES:
INVENTORS
ATTORNEY

UNITED STATES PATENT OFFICE.

HENRY D. JAMES AND WILLIAM A. DICK, OF PITTSBURG, PENNSYLVANIA, ASSIGNORS TO WESTINGHOUSE ELECTRIC & MANUFACTURING COMPANY, A CORPORATION OF PENNSYLVANIA.

SYSTEM OF ELECTRIC-MOTOR CONTROL.

No. 924,785.  Specification of Letters Patent.  Patented June 15, 1909.

Application filed October 18, 1907. Serial No. 398,066.

*To all whom it may concern:*

Be it known that we, HENRY D. JAMES and WILLIAM A. DICK, citizens of the United States, and residents of Pittsburg, in the county of Allegheny and State of Pennsylvania, have invented a new and useful Improvement in Systems of Electric-Motor Control, of which the following is a specification.

Our invention relates to systems of electric motor control, and has special reference to systems in which the control of the motor is effected by governing the field of the generator from which it is supplied with energy.

The object of our invention is to provide improved means for governing the generator field resistance in systems of the class above indicated, and other means for automatically protecting the generator against injury.

When electric motors are employed to operate large variable loads, their speeds and directions of rotation are frequently governed by adjusting the field strengths and polarities of the generators supplying them with energy, and further variations in speed are sometimes effected by means of rheostats in the field circuits of the motors. The generators employed in the above relations are frequently direct-connected to a driving motor of the induction type and are designed to produce a predetermined desired voltage when operating at the normal full load speed of the motor. If the generator field is strengthened suddenly before the generator load is assumed, an abnormally high voltage will be delivered from the generator, since the slip of the induction motor is small.

According to our present invention, an abnormal generator voltage is prevented by means of a device which is adapted to automatically delay the action of the controller that governs the field strength of the generator.

Figure 1:
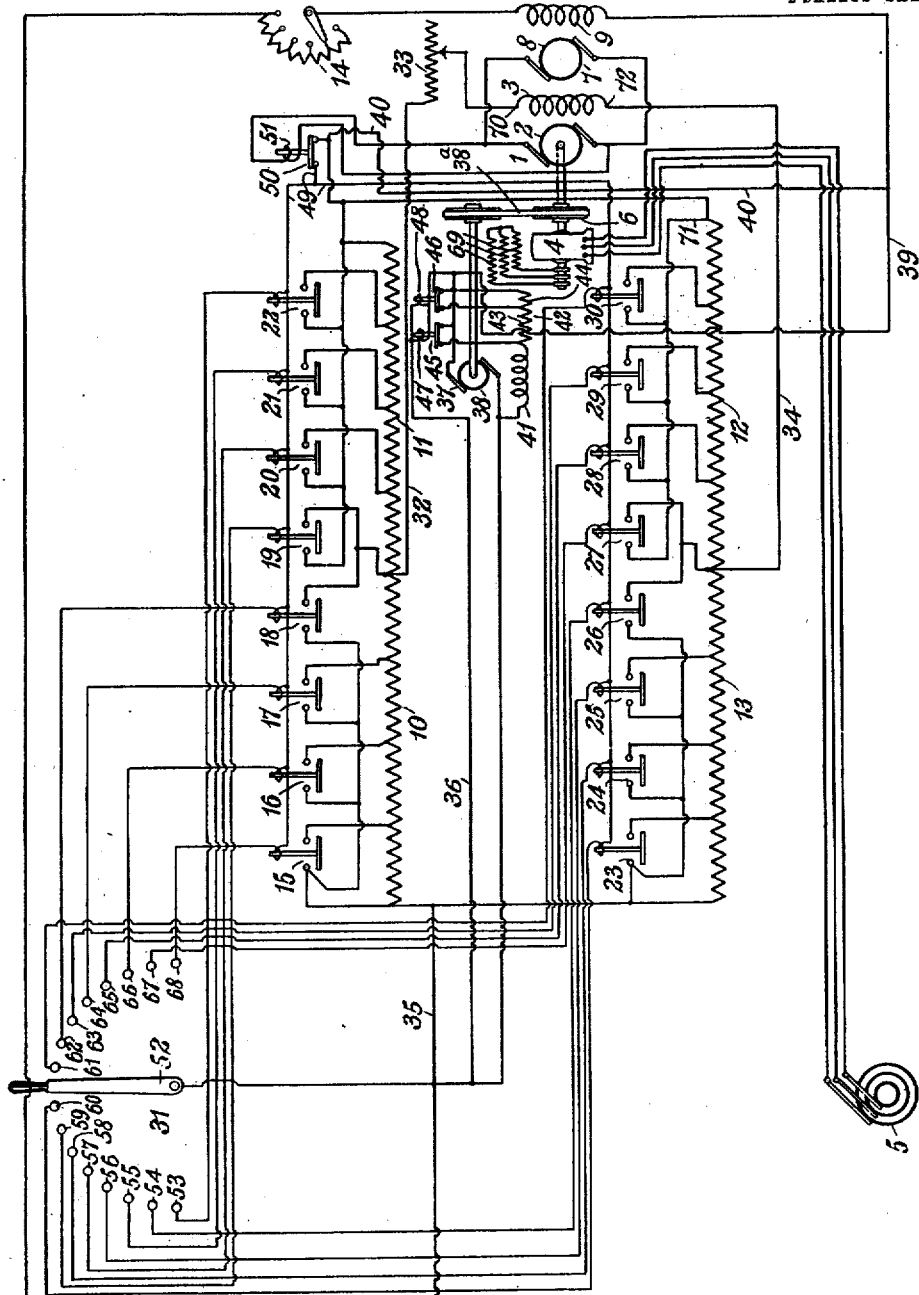
Figure 2:
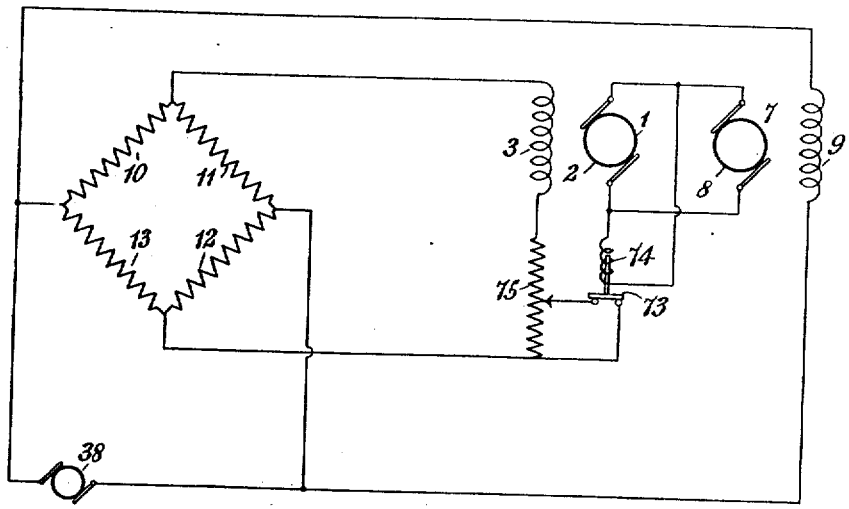

Figure 1 of the accompanying drawing is a diagrammatic view of a system arranged in accordance with our invention, and Fig. 2 is a similar view of a slightly modified system, the main circuits of which are similar to those of Fig. 1.

Referring to the drawings, with special reference to Fig. 1, a generator 1, having an armature 2 and a field magnet winding 3, is driven by an electric motor 4 which receives its energy from any suitable source, such as a polyphase alternating current generator 5.

The rotating parts of the generator 1 and the motor 4 and a fly-wheel 6 are mounted on the same shaft, or are otherwise operatively connected.

A motor 7, having an armature 8 which is electrically connected to the armature 2 of the generator 1 and a field magnet winding 9, is controlled as to its speed and direction of rotation, by resistance sections 10, 11, 12 and 13, which are associated with the field circuit of the generator, and a rheostat 14 which is connected in the field circuit of the motor.

The resistance sections 10, 11, 12 and 13 are connected in a continuous circuit, as in a Wheatstone bridge, and are controlled by a plurality of independently-operated switches 15 to 30, inclusive, which, in turn, are governed by a master controller 31 and are provided with operating electro-magnets. The junction of the resistance sections 10 and 11 is connected to one terminal of the generator field magnet winding 3 by conductor 32 and resistance 33, and the other terminal of the winding is connected to the junction of the resistance sections 12 and 13 by a conductor 34. The junctions of the resistance sections 10 and 13 and 11 and 12 are respectively connected to the armature terminals 37 of an exciter generator 38 by conductors 35 and 36 and conductors 39 and 40.

It will be observed that one pair of opposite terminals of the resistance considered as the Wheatstone bridge is connected to the field manget winding of the generator, while the other pair of terminals is connected to the exciter armature.

The exciter generator 38 is provided with a field magnet winding 41 having a resistance 42 which is divided into sections 43 and 44. These resistance sections are normally short-circuited by switches 45 and 46 which are operated by electro-magnets 47 and 48 that are connected in multiple circuit across the armature of the exciter. The electro-magnets for the switches 15 to 30, inclusive, are provided with a common return circuit conductor 49 which is connected to the negative terminal of the exciter through a relay switch 50 having a magnet winding 51 that is connected directly across the armature circuit of the generator 1.

The master controller 31 comprises a contact arm 52 and a plurality of engaging contact fingers 53 to 68, inclusive, that are respectively connected to the positive terminals of the electro-magnets for the switches 15 to 30, inclusive, the contact arm being connected to the positive terminal of the exciter 38.

The operation of, and the circuit connections for, the system are as follows: A secondary resistance 69 of the motor 4 is inserted or removed from the secondary circuit of the motor, according as the load taken from the generator 1 exceeds or falls below predetermined amounts, the speed of the motor being allowed to decrease when the speed of the generator load exceeds the predetermined value, thereby permitting the kinetic energy of the fly-wheel 6 to be yielded for the purpose of supplementing the power supplied by the motor. When the generator load is light, the motor speed is increased so that energy may be stored in the fly-wheel. In this way, the amount of current derived from the generator 5 from which the motor is supplied may be maintained at a substantially constant value and is prevented from exceeding a predetermined amount. A more detailed description of this portion of the system is deemed unnecessary, since it is completely set forth in a co-pending application, Serial No. 337,278, filed October 3, 1906, by Henry D. James.

When the master controller 31 occupies a position as shown in Fig. 1, the generator field circuit is interrupted and, consequently, the generator will deliver no energy to the motor 8. If, now, it is desirable to operate the motor in one direction, the control handle 52 may be moved into successive engagement with contact fingers 61 to 68, inclusive. This action effects the successive closure of switches 30, 18, 29, 17, 28, 16, 27 and 15 and thereby gradually short-circuits the resistance sections 10 and 12. Assuming that the resistance sections 10, 11, 12 and 13 are substantially of equal resistance, the two paths from the positive terminal of the exciter to the field magnet winding of the generator 1 which were balanced when the switches 15 to 30, inclusive, were open are now materially unbalanced so that current is supplied from the positive armature terminal 37 of the exciter through conductors 36 and 35, switch 18, conductor 32 and resistance 33 to a terminal 70 of field magnet winding 3 of the generator 1, circuit being completed from this point through the field magnet winding, conductor 34, switch 27, conductors 71, 40 and 39 to the negative armature terminal 37. If it is desired to operate the motor in the reverse direction, the contact arm 52 may be moved into successive engagement with contact fingers 60 to 53, inclusive, which will effect the closure of the switches 23, 19, 24, 20, 25, 21, 26 and 22. Thus the resistance sections 11 and 13 are gradually short-circuited and the circuits which were unbalanced in the relations above indicated are now unbalanced in the opposite direction. Current is now supplied from the armature of the exciter 38 through conductors 36 and 35, switch 26, conductor 34 to a terminal 72 of the field magnet winding 3. By this means the magnetization of the field of the generator is reversed and, consequently, energy will be supplied to the motor armature in the reverse direction, which will cause a reverse rotation of the motor armature. One of the principal advantages in the Wheatstone bridge method of field control lies in the fact that the field magnet winding of the generator is never completely interrupted for, although energy may not be supplied to it, a resistance is always connected in multiple circuit with it.

In order to prevent a careless or ignorant operator from increasing the voltage of the generator too rapidly by moving the arm 52 of the master controller to one extreme position or the other without waiting for the generator to assume its load, we provide the switch 50, which may be automatically opened by a magnet winding 51 when the voltage existing across the armature of the generator 1 exceeds a predetermined amount. The magnet windings of the switches 15 to 30, inclusive, are all supplied with energy from the exciter 38 through conductor 36 and the master controller 31 and are united in one common return circuit which is established through conductor 49, switch 50 and conductors 40 and 39. Consequently, the opening of the switch 50, which is effected by the abnormal increase in the generator voltage, serves to open all the resistance control switches. It then becomes necessary for the operator to return the master controller to a position in which the motor 7 may accelerate and in which the generator voltage will not exceed a predetermined amount.

The exciter 38 is driven from the shaft of the motor 4 by a belt 38$^a$, or is otherwise operatively connected to the motor, consequently, its voltage would be variable unless some suitable means were provided for governing the resistance included in its field circuit. In our present system this is accomplished by means of switches 45 and 46, which are adapted to short-circuit a part or all of the resistance 42 which is connected in series with the field magnet winding 41 of the exciter. These switches are provided with dissimilar operating magnet windings 47 and 48 which are connected in multiple circuit across the armature of the exciter. The windings are so designed that, as the voltage across the exciter armature is increased, the switch 45 will first open and will insert resistance section 43 in the field circuit, and this weakening of the field will tend to correct the variations in the exciter voltage. If still wider fluctuations in the voltage occur, the switches 45 and 46 will both open and the entire resistance 42 will be inserted in the field circuit. It will be readily understood that switches 45 and 46 will open and close at frequent intervals but, since the field circuit itself is not interrupted, little, if any, arcing will occur at the switch terminals.

Referring to Fig. 2 of the drawings, a switch 73, which corresponds to the switch 50 of Fig. 1, and is operated by an electromagnet 74 that is connected across the armature of the generator, is adapted in this system to insert an auxiliary resistance 75 into the field circuit of the main generator. If the field control is effected, as shown in Fig. 1, an abnormal increase in the generator voltage may be prevented by the switch 73, provided the resistance 75 is properly designed.

It is evident that various modifications may be effected in the circuit arrangements of the systems shown without departing from the spirit of our invention, and we desire that only such limitations shall be imposed as are indicated in the appended claims.

We claim as our invention:

1. In a control system, the combination with a motor, a generator electrically connected thereto, and means for governing the generator field to control the motor, of means dependent upon the generator voltage for delaying the action of the field governor.

2. In a control system, the combination with a motor, a generator electrically connected thereto, a field rheostat for the generator, and independently-operated switches for controlling the resistance, of means dependent upon the generator voltage for delaying the action of the control switches.

3. In a system of electric motor control, the combination with a motor, a generator electrically connected thereto, a field resistance for the generator, and means for controlling said resistance to vary the speed and direction of rotation of the motor, of means dependent upon the generator voltage for delaying the action of the resistance-controlling means.

4. In a system of electric motor control, the combination with a generator having a field magnet winding, a resistance connected in a continuous ring circuit, two opposite points of which are connected to the generator field winding, an exciter generator connected to the remaining quadrature points of the resistance, and a plurality of independently operated switches for controlling the resistance, of means dependent upon the voltage of the main generator for automatically delaying the action of the resistance-controlling switches.

5. In a system of electric motor control, the combination with a generator having a field magnet winding, a resistance connected in a continuous ring circuit, two opposite points of which are connected to the generator field winding, an exciter generator connected to the remaining quadrature points of the resistance, a plurality of independently operated switches for controlling the resistance, and a master switch for governing the closure of the switches, of means dependent upon the voltage of the main generator for automatically delaying the action of the resistance-controlling switches.

6. In a control system, the combination with a generator, driving means therefor, a motor electrically connected to the generator, and an exciter generator, a resistance connected in a continuous circuit, two opposite points of which are connected to the field winding of the main generator and the other quadrature points of which are connected to the exciter generator, and means for governing the resistance to vary the speed and direction of rotation of the motor, of a limit switch having a magnet winding connected across the main generator armature for automatically preventing an abnormal increase in the generator voltage.

7. In a control system, the combination with a polyphase alternating current circuit, a non-synchronous motor supplied therefrom, a direct current generator, an exciter generator driven by the motor, and a fly-wheel or other revolving mass mounted on the common shaft, a direct current motor electrically connected to the direct current generator, and a resistance forming a continuous circuit and connected, at opposite points, to the generator field winding, the other points of quadrature being connected to the exciter generator, of independently operated switches for controlling the resistance to govern the speed and direction of rotation of the direct current motor.

8. In a control system, the combination with a polyphase alternating current circuit, a non-synchronous motor supplied therefrom, a direct current generator and an exciter generator driven by the motor, and a fly-wheel or other revolving mass mounted on the common shaft, a direct current motor electrically connected to the direct current generator, and a resistance forming a continuous circuit and connected, at opposite points, to the generator field winding, the other points of quadrature being connected to the exciter generator, of independently operated switches for controlling the resistance to govern the speed and direction of rotation of the direct current motor, and means dependent upon the generator voltage for automatically delaying the variations in the field strength of the generator.

9. In a control system, the combination with a generator, driving means therefor, a motor electrically connected to the generator, an exciter generator, a field resistance, a resistance connected in a continuous circuit, two opposite points of which are connected to the field of the main generator and the other quadrature points of which are connected to the exciter generator, and means for governing the resistance to vary the speed and direction of rotation of the motor, of a limit switch having a magnet winding connected across the main generator armature for automatically preventing an abnormal increase in the generator voltage, a resistance for the exciter field winding, and means dependent upon the voltage of the exciter for automatically short-circuiting a part or all of the field resistance.

10. In a system of electric motor control, the combination with a resistance connected in a continuous circuit, a supply circuit connected to opposite points therein, and an outgoing circuit connected to the remaining points of quadrature, of a plurality of independently operated switches for governing the resistance included in each of the four legs of the resistance circuit.

11. In a control system, the combination with a generator, and means for governing the generator field, of means dependent upon the generator voltage for delaying the action of the field governor.

In testimony whereof, we have hereunto subscribed our names this 11th day of October, 1907.

HENRY D. JAMES.
WILLIAM A. DICK.

Witnesses as to Henry D. James:
  R. J. DEARBORN,
  WESLEY G. CARR.
Witnesses as to William A. Dick:
  CARL F. LAMBERT,
  BIRNEY HINES.